(12) United States Patent
Jenkins et al.

(10) Patent No.: US 11,475,783 B2
(45) Date of Patent: Oct. 18, 2022

(54) INTEREST-BASED CONTENT CUSTOMIZATION

(71) Applicant: International Business Machines Corporation, Armonk, NY (US)

(72) Inventors: Jana H. Jenkins, Raleigh, NC (US); Zachary A. Silverstein, Jacksonville, FL (US); Jeremy R. Fox, Georgetown, TX (US); Fang Lu, Billerica, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 348 days.

(21) Appl. No.: 16/857,837

(22) Filed: Apr. 24, 2020

(65) Prior Publication Data
US 2021/0335143 A1      Oct. 28, 2021

(51) Int. Cl.
*G09B 5/12*      (2006.01)
*G06F 3/01*      (2006.01)
*G06F 16/9535*   (2019.01)
*G06V 40/16*     (2022.01)

(52) U.S. Cl.
CPC .............. *G09B 5/12* (2013.01); *G06F 3/011* (2013.01); *G06F 16/9535* (2019.01); *G06V 40/174* (2022.01)

(58) Field of Classification Search
CPC ....... G09B 5/12; G06F 16/9535; G06F 3/011; G06V 40/174
See application file for complete search history.

(56) References Cited

U.S. PATENT DOCUMENTS

| | | | |
|---|---|---|---|
| 6,334,109 B1 | 12/2001 | Kanevsky et al. | |
| 8,990,208 B2 * | 3/2015 | Wang | G06Q 50/01 707/732 |
| 9,848,241 B2 * | 12/2017 | Zilberstein | H04N 21/435 |
| 10,068,006 B1 * | 9/2018 | Indukuri | G06F 16/3322 |
| 10,741,215 B1 * | 8/2020 | Sundareson | H04L 65/60 |
| 2008/0147505 A1 | 6/2008 | Davis | |
| 2011/0066497 A1 | 3/2011 | Gopinath et al. | |
| 2011/0320441 A1 * | 12/2011 | Lee | G06F 16/9535 707/723 |

(Continued)

OTHER PUBLICATIONS

A Global Framework of Reference on Digital Literacy Skills for Indicator 4.4.2, UNESCO Institute for Statistics, Jun. 2018.

(Continued)

*Primary Examiner* — Justin S Lee
(74) *Attorney, Agent, or Firm* — Troutman Pepper Hamilton Sanders LLP

(57) ABSTRACT

A computer-implemented method for customizing training contents for a user, including: establishing a user profile and a personal learning corpus for the user; generating a first baseline indicating that the user is interested and a second baseline indicating that the user is not interested; monitoring the user's reactions when the user is consuming contents related to a second topic, wherein the reactions include the one or more of biometrical indicators, facial expressions, and body language; comparing the reactions with the first baseline and the second baseline to determine an interest level; and recommending additional contents related to the second topic if the interest level is higher than a predefined threshold.

20 Claims, 4 Drawing Sheets

(56) References Cited

U.S. PATENT DOCUMENTS

| | | |
|---|---|---|
| 2014/0236953 A1 | 8/2014 | Rapaport et al. |
| 2016/0078369 A1 | 3/2016 | Frank et al. |
| 2016/0092781 A1* | 3/2016 | Byrnes ................ G06F 16/2425 |
| | | 706/52 |
| 2016/0109941 A1* | 4/2016 | Govindarajeswaran ..................... |
| | | G06F 16/54 |
| | | 345/156 |
| 2017/0289635 A1 | 10/2017 | Shaw et al. |
| 2018/0204245 A1* | 7/2018 | Krauss ............... G06Q 30/0255 |
| 2018/0373058 A1* | 12/2018 | Bostick ................ H04N 5/2257 |
| 2021/0133851 A1* | 5/2021 | Chen .................... G06K 9/6263 |

OTHER PUBLICATIONS

Digital India—Technology to Transform a Connected Nation, McKinsey Global Institute, 2019.

Moses, KR, Automated Fingerprint Identification System (AFIS)—Chapter 6, 2019.

Method and System for Providing Recommendation for Priority Based Trading of Items, Anonymously, Nov. 29, 2018, IPCOM000256435D.

Managing Work Experiences in Real-Time to Maximize Effectiveness of a Development Plan, Anonymously, Nov. 9, 2018, IPCOM000256185D.

Method and System for Cognitively Developing Social Interaction Skills of a User by Correlating Contextual Data of User Emotions, Anonymously, May 15, 2018, IPCOM000253918D.

* cited by examiner

INTEREST-BASED CONTENT CUSTOMIZATION

TECHNICAL FIELD

The present application generally relates to content customization, and more particularly, to training content customization based on a user interest.

BACKGROUND

Employers generally provide training resources to employees for upskilling. Currently, employers provide a list of training resources or contents to the employees, and the employees manually select the ones which interest them. Thus, it is desired to introduce an approach of automatically customizing training content for each employee based on individual interest, without manual efforts.

SUMMARY

Embodiments provide a computer-implemented method for customizing training contents for a user in a data processing system comprising a processor and a memory comprising instructions which are executed by the processor. The method includes: establishing, by the processor, a user profile and a personal learning corpus for the user; generating, by the processor, a first baseline indicating that the user is interested in a first topic and a second baseline indicating that the user is not interested in the first topic, wherein the first baseline and the second baseline are generated based on one or more of biometrical indicators, facial expressions, and body language when the user is consuming contents related to the first topic; monitoring, by the processor, the user's reactions when the user is consuming contents related to a second topic, wherein the reactions include the one or more of biometrical indicators, facial expressions, and body language; comparing, by the processor, the reactions with the first baseline and the second baseline to determine an interest level; and recommending, by the processor, additional contents related to the second topic if the interest level is higher than a predefined threshold.

Embodiments further provide a computer-implemented method for customizing training contents for a user, further comprising: adding, by the processor, the recommended contents into the personal learning corpus.

Embodiments further provide a computer-implemented method for customizing training contents for a user, further comprising: updating, by the processor, the user profile with one or more skills learnt from the recommended contents.

Embodiments further provide a computer-implemented method for customizing training contents for a user, wherein the user profile includes contents that the user has viewed and skills that the user has.

Embodiments further provide a computer-implemented method for customizing training contents for a user, wherein the contents that the user has viewed include live presentations, online presentations, online or physical books, online or physical training materials, and emails.

Embodiments further provide a computer-implemented method for customizing training contents for a user, wherein the skills that the user has are revealed in a resume and skill badges.

Embodiments further provide a computer-implemented method for customizing training contents for a user, wherein the biometrical indicators include eye movement and heart rate.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a full question generation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present invention may be a system, a method, and/or a computer program product implemented on a cognitive system. The computer program product may include a computer readable storage medium (or media) having computer readable program instructions thereon for causing a processor to carry out aspects of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human-readable language and identify inferences between text passages with human-like accuracy at speeds far faster than human beings and on a much larger scale. In general, such cognitive systems can perform the following functions:

Navigate the complexities of human language and understanding

Ingest and process vast amounts of structured and unstructured data

Generate and evaluate hypotheses

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language-specific or agnostic attributes from natural language

High degree of relevant recollection from data points (images, text, voice) (memorization and recall)

Predict and sense with situation awareness that mimic human cognition based on experiences Answer questions based on natural language and specific evidence In one aspect, the cognitive system can be augmented with a content customization system. This disclosure provides a content customization system, method, and computer product, which can automatically customize training content for each user based on individual interest. The content customization system can monitor each user's reactions when each user receives a training presentation or views training content about a particular topic, and provide additional training content relevant to the particular topic for each user who is interested in the particular topic. In an embodiment, the reactions can include biometrical indicators, facial expressions, and body language, etc., and the content customization system can assess an interest level of each user based on the reactions, and only deliver the relevant content to users having a higher interest level.

Figure 1:
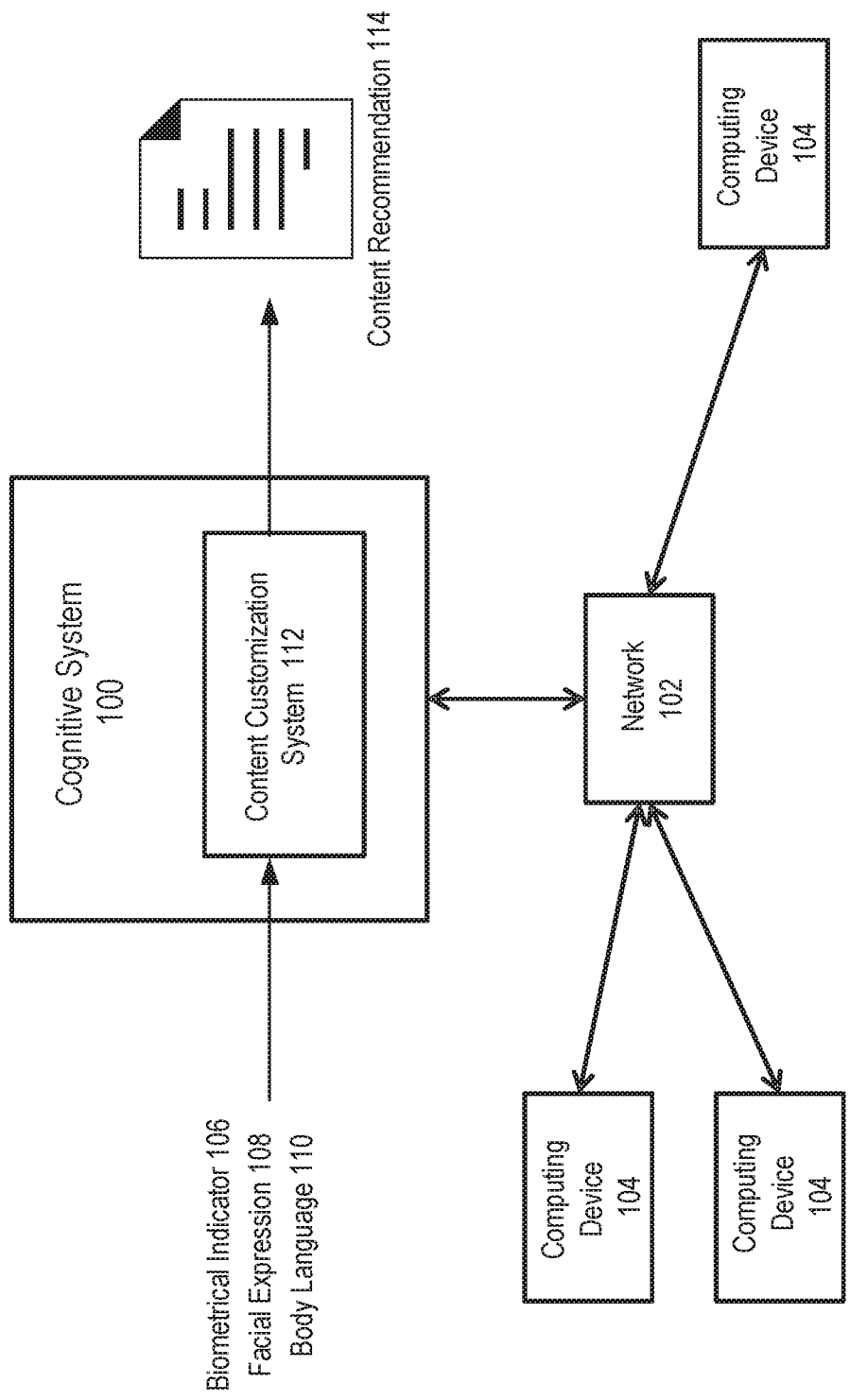
FIG. 1 depicts a schematic diagram of one illustrative embodiment of a cognitive system 100 implementing an exemplary content customization system 112 in a computer network.

FIG. 1 depicts a schematic diagram of one illustrative embodiment of a cognitive system 100 implementing an exemplary content customization system 112 in a computer network 102. The cognitive system 100 is implemented on one or more computing devices 104 (comprising one or more processors and one or more memories, and potentially any other computing device elements generally known in the art including buses, storage devices, communication interfaces, and the like) connected to the computer network 102. The computer network 102 includes multiple computing devices 104 in communication with each other and with other devices or components via one or more wired and/or wireless data communication links, where each communication link comprises one or more of wires, routers, switches, transmitters, receivers, or the like. Other embodiments of the cognitive system 100 may be used with components, systems, sub-systems, and/or devices other than those that are depicted herein. The computer network 102 includes local network connections and remote connections in various embodiments, such that the cognitive system 100 may operate in environments of any size, including local and global, e.g., the Internet. The cognitive system 100 is configured to implement a content customization system 112 that can automatically customize training content for each user based on individual interest. The content customization system 112 receives user reactions, such as biometrical indicators 106 (e.g., eye movement, heart rate, etc.), facial expressions 108, and body language 110, etc., for a particular topic, and can decide whether the user is interested in the topic or not. Then the content customization system 112 can provide content recommendation 114 and push relevant training content to the user if the user is interested in the particular topic. The content customization system 112 utilizes a machine learning technique, e.g., a convolutional neural network, to recommend training content for each user based on individual interest.

Figure 2:
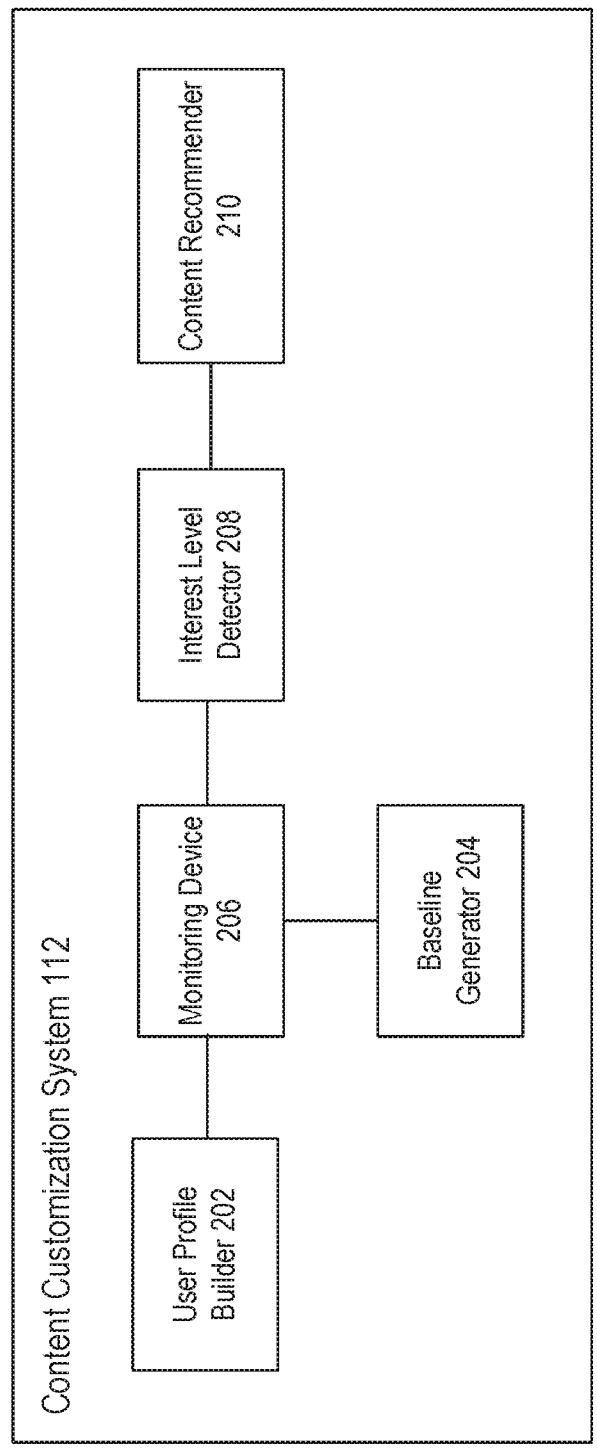
FIG. 2 depicts a block diagram of one illustrative embodiment of the content customization system 112, according to embodiments described herein.

FIG. 2 depicts a schematic diagram of one illustrative embodiment of the content customization system 112, according to embodiments described herein. As shown in FIG. 2, in an embodiment, the content customization system 112 includes the user profile builder 202, the baseline generator 204, the monitoring device 206, the interest level detector 208, and the content recommender 210. The user profile builder 202 is configured to build a user profile for each user. Each user profile can include, e.g., the contents (e.g., live presentations, online presentations, books, training materials, emails, etc.) that the user has viewed, skills or experience that the user has, etc. The baseline generator 204 is configured to generate a first baseline indicating the user is interested and a second baseline indicating the user is not interested. The two baselines can be generated based on biometrical indicators, facial expressions, and/or body language of the user for any topic. For example, if the user blinks five times and leans forward (a first baseline), then the user is interested; while the user blinks fifty times and leans backward (a second baseline), then the user is uninterested. For another example, if the user completes the whole online presentation (a first baseline), then the user is interested in the online presentation; while the user stops watching the online presentation after 5 minutes (a second baseline), then the user is uninterested in the online presentation. Each user may have different baselines, because each user can have different biometrical indicators, facial expressions, and body language even for the same topic. The monitoring device 206 is configured to monitor biometrical indicators, facial expressions, and body language of the user. The monitoring device 206 can be one or more Internet of things (IoT) devices, e.g., a mobile phone, a smartwatch (e.g., configured to detect a heart rate of the user), a camera (e.g., configured to detect facial expressions and body language of the user), etc. The interest level detector 208 is configured to determine an interest level of the user based on the biometrical indicators, facial expressions, and body language of the user collected by the monitoring device 206 and two baselines. The newly collected biometrical indicators, facial expressions, and body language are compared with the two baselines, so that the interest level can be calculated based on the difference between the newly collected data and the two baselines. For example, the interest level can be defined by a value between 0 (least interested) and 10 (most interested). The content recommender 210 is configured to automatically push relevant training content to the user if the user is interested in (e.g., the interest level value is more than a predefined threshold value, e.g., 6) a particular topic.

Figure 3:
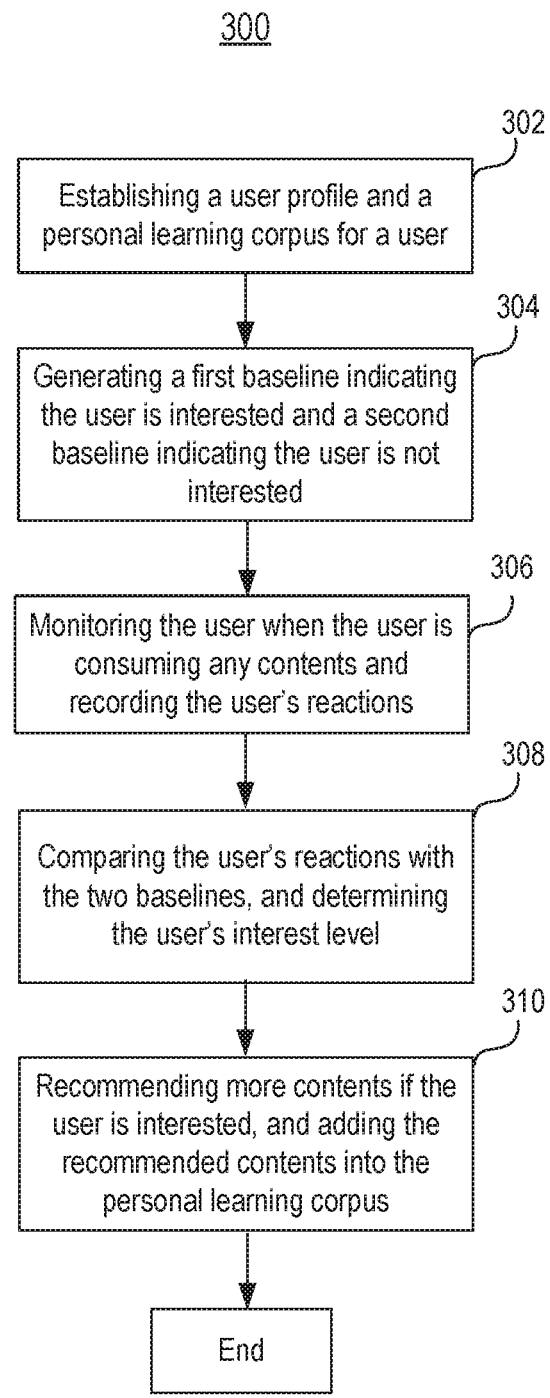
FIG. 3 illustrates a flowchart diagram depicting a method 300 of customizing training contents for a user, according to embodiments described herein.

FIG. 3 illustrates a flowchart diagram depicting a method 300 of customizing training contents for a user, according to embodiments described herein. At step 302, a user profile and a personal learning corpus can be established for a user. The user profile includes, e.g., the contents (e.g., live presentations, online presentations, online or physical books, online or physical training materials, emails, etc.) that the user has viewed, skills or experience that the user has, etc. The user profile can be established through referencing past training history, class attendance history, a resume, skill badges, etc. The resume of a user may list the experience and skills that the user owns. The skill badges can be issued by an employer, a professional organization, or a professional association, etc., when the user completes certain training content to learn a new skill. The learning corpus can include the contents that the user has viewed and the contents to be viewed as recommended by the content customization system 112.

At step 304, the content customization system 112 generates a first baseline indicating the user is interested and a second baseline indicating the user is not interested. The baselines can be established in view of biometrical indicators, facial expressions, or/and body language of the user. For example, the baselines can be established in view of a heart rate and a facial expression of the user when the user is interested or uninterested in one or more general topics. The two baselines can show typical biometrical indicators, facial expressions, and/or body language when the user is interested or uninterested in something.

At step 306, the content customization system 112 monitors the user when the user is consuming any contents (e.g., listening to presentations or viewing online contents) and records the user's reactions (biometrical indicators, facial expressions, or/and body language). In an embodiment, while a user is watching content (either a live content (e.g., a presentation) or online content), the content customization system 112 is monitoring the user's reaction to the content. In an embodiment, the content customization system 112 can monitor the user through a camera integrated in a computer, or installed on a presentation site. For example, the content customization system 112 can monitor facial expressions, body language (e.g., arms crossed over the chest; hand placed on the cheek; head tilted to one side), and/or biometrical indicators (e.g., eye movement) through the camera. In another embodiment, the content customization system 112 can also monitor the user's heart rate through an application on a smartwatch or a mobile phone.

At step 308, the content customization system 112 compares the user's reactions with the two baselines (the first baseline for the interested attitude and the second baseline for the uninterested attitude), and determines the user's interest level.

At step 310, if a user's interest level is high (e.g., the interest level is higher than a predefined threshold), the content customization system 112 recommends more contents related to the content receiving a high interest, and adds the recommended contents into the personal learning corpus for future learning. If the user is highly interested in a particular topic, the content customization system 112 would recommend the contents relevant to the particular topic to the user, so as to increase the skills of the user on the particular topic. The content customization system 112 can make an upskilling recommendation based on a user's interest. After the user learns the recommended contents, the user profile would be updated with the recommended contents and skills gained from the recommended contents.

A plurality of examples are provided herein to further illustrate the method of customizing training contents for a user. In the first example, a user is listening to a speech about career development. The user shows a great interest when the presenter talks about the importance of public speaking, Cloud Computing and Red Hat Open Shift Technology. The content customization system 112 identifies the user's current level of expertise for these three topics based on the user profile, and then determines the difference between the user's current level and the expected level based on this user's job profession. For example, if the user is a software architect, then he/she needs to reach the expert level for these three topics. The content customization system 112 will recommend actions (e.g., attending the public speaking classes in person, taking online classes for Cloud Computing, etc.) he/she needs to take to reach the expert level.

In the second example, an employee named Jessica works for a company and has been trying to develop her aging skill set to retool her knowledge to stay current with new technologies. Jessica loves to code, but she is only familiar with older legacy languages, e.g., C++, Basic, etc. She has been attending some company live presentations and online Python and Machine Learning courses. The content customization system 112 has built a profile for Jessica and thus understands her current state of knowledge on various topics. While watching a general "Welcome to the Future" presentation in her company's cafeteria in Austin, Tex., she started to become highly interested in the advertised Python and Machine Learning courses that were mentioned in the presentation. The content customization system 112 detects the interest level of Jessica and recommends contents (live presentations, online courses, training materials, etc.) related to Python and Machine Learning that Jessica would probably find favorable for future learning. After the content customization system 112 recommends these contents, Jessica decides to attend a Python course and a Machine Learning course. Jessica is highly satisfied with these two courses and provides an NPS (Net Promoter Score) of 9 and 10 for these two courses, thus showing the values of these two courses for her. Upon completion of these two courses, Jessica's profile is updated with the new skills she learned in the Python and Machine Learning courses.

In the third example, a user (e.g., an employee) is listening to another employee's presentation regarding patent applications. The content customization system 112 detects the interest level of the user and identifies that he/she is new to inventions (no patents issued, and/or submitted, etc.) based on the user profile. Thus, the content customization system 112 recommends a plurality of links for the user to access (e.g., slack channels for finding a patent mentor and inventors, a link to connect with Master Inventors, online presentations regarding inventions, and the like). The user finds a mentor through the links, joins a brainstorming team, learns the invention process, and successfully files a patent application. The content customization system 112 updates the user profile to show competence in this skill.

In the fourth example, a first user's personal learning corpus can be compared to other users' personal learning corpora, and the new contents from other users' personal learning corpora can be added into the first user's personal learning corpus. The other users can be "similar" to the first user, e.g., the other users may have the same job title as the first user, or other users may join in the same live presentation as the first user. In an embodiment, the "similarity" can be identified based on the user profile of the first user and the user profiles of the other users. Thus, due to the "similarity," the contents recommended to the other users may also be useful for the first user.

In a fifth example, if the user is not interested in a particular topic, the content customization system 112 can identify the particular topic that the user is not interested in, so that the content customization system 112 would not recommend more contents similar to, or related to the particular topic.

The content customization system 112 can upskill a user in topics in which they are interested. The content customization system 112 can provide a personalized learning space for each user and can be applied in an education area.

Figure 4:
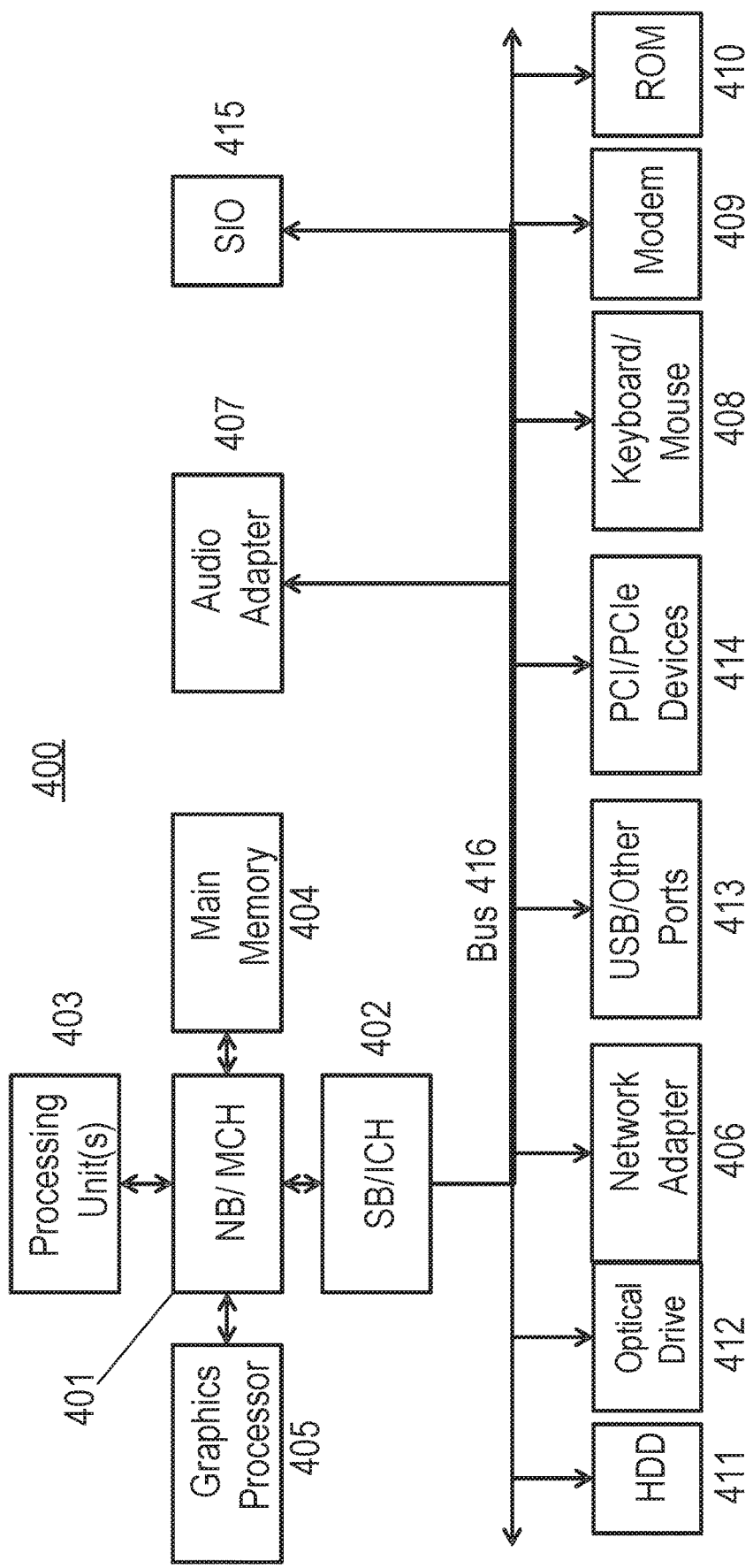
FIG. 4 is a block diagram of an example data processing system 400 in which aspects of the illustrative embodiments are implemented.

FIG. 4 is a block diagram of an example data processing system 400 in which aspects of the illustrative embodiments are implemented. Data processing system 400 is an example of a computer, such as a server or a client, in which computer usable code or instructions implementing the process for illustrative embodiments of the present invention are located. In one embodiment, FIG. 4 represents a server computing device, such as a server, which implements the content customization system 112 and cognitive system 100 described herein.

In the depicted example, the data processing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH 401 through an accelerated graphics port (AGP).

In the depicted example, the network adapter 406 connects to the SB/ICH 402. The audio adapter 407, keyboard and mouse adapter 408, modem 409, read-only memory (ROM) 410, hard disk drive (HDD) 411, optical drive (CD or DVD) 412, universal serial bus (USB) ports and other communication ports 413, and the PCI/PCIe devices 414 can connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or serial advanced technology attachment (SATA) interface. The super I/O (SIO) device 415 can be connected to the SB/ICH.

An operating system can run on processing unit 403. The operating system can coordinate and provide control of various components within the data processing system 400. As a client, the operating system can be a commercially available operating system. An object-oriented programming system, such as the Java™ programming system, may run in conjunction with the operating system and provide calls to the operating system from the object-oriented programs or applications executing on the data processing system 400. As a server, the data processing system 400 can be an IBM® eServer™ System p® running the Advanced Interactive Executive operating system or the Linux operating system. The data processing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the full question generation system can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or network adapter 406 can include one or more devices that can be used to transmit and receive data.

Those of ordinary skill in the art will appreciate that the hardware depicted in FIG. 4 may vary depending on the implementation. For example, the data processing system 400 includes several components that would not be directly included in some embodiments of the content customization system 112. However, it should be understood that the content customization system 112 may include one or more of the components and configurations of the data processing system 400 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data processing system 400 can take the form of any of a number of different data processing systems, including but not limited to, client computing devices, server computing devices, tablet computers, laptop computers, telephone or other communication devices, personal digital assistants, and the like. Essentially, data processing system 400 can be any known or later developed data processing system without architectural limitation.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 USC. 112 (f), unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for customizing training contents for a user in a data processing system comprising a processor and a memory comprising instructions which are executed by the processor, the method comprising:

establishing, by the processor, a user profile and a personal learning corpus for the user;

generating, by the processor, a first baseline indicating that the user is interested in a first topic and a second baseline indicating that the user is not interested in the first topic, wherein the first baseline and the second baseline are generated based on one or more of biometrical indicators, facial expressions, and body language when the user is consuming contents related to the first topic;

monitoring, by the processor, the user's reactions when the user is consuming contents related to a second topic, wherein the reactions include the one or more of biometrical indicators, facial expressions, and body language;

comparing, by the processor, the reactions with the first baseline and the second baseline to determine an interest level; and recommending, by the processor, additional contents related to the second topic if the interest level is higher than a predefined threshold.

2. The method of claim 1, further comprising:
adding, by the processor, the recommended contents into the personal learning corpus.

3. The method of claim 1, further comprising:
updating, by the processor, the user profile with one or more skills learnt from the recommended contents.

4. The method of claim 1, wherein the user profile includes contents that the user has viewed and skills that the user has.

5. The method of claim 4, wherein the contents that the user has viewed include live presentations, online presentations, online or physical books, online or physical training materials, and emails.

6. The method of claim 4, wherein the skills that the user has are revealed in a resume and skill badges.

7. The method of claim 1, wherein the biometrical indicators include eye movement and heart rate.

8. A computer program product for customizing training contents for a user, the computer program product comprising a computer readable storage medium having program instructions embodied therewith, the program instructions executable by a processor to cause the processor to:
establish a user profile and a personal learning corpus for the user;
generate a first baseline indicating that the user is interested in a first topic and a second baseline indicating that the user is not interested in the first topic, wherein the first baseline and the second baseline are generated based on one or more of biometrical indicators, facial expressions, and body language when the user is consuming contents related to the first topic;
monitor the user's reactions when the user is consuming contents related to a second topic, wherein the reactions include the one or more of biometrical indicators, facial expressions, and body language;
compare the reactions with the first baseline and the second baseline to determine an interest level; and
recommend additional contents related to the second topic if the interest level is higher than a predefined threshold.

9. The computer program product as recited in claim 8, wherein the processor is further caused to:
add the recommended contents into the personal learning corpus; and
update the user profile with one or more skills learnt from the recommended contents.

10. The computer program product as recited in claim 8, wherein the user profile includes contents that the user has viewed and skills that the user has.

11. The computer program product as recited in claim 10, wherein the contents that the user has viewed include live presentations, online presentations, online or physical books, online or physical training materials, and emails; and the skills that the user has are revealed in a resume and skill badges.

12. The computer program product as recited in claim 8, wherein the processor is further caused to:
identify the user's current level of expertise based on the user profile, and an expected level of expertise based on the user's job title;
determine a difference between the user's current level and expected level; and
recommend the additional contents based on the difference, so that the user reaches the expected level.

13. The computer program product as recited in claim 8, wherein the processor is further caused to
compare the personal learning corpus with other users' personal learning corpora; and
adding new contents of the other users' personal learning corpora into the personal learning corpus.

14. The computer program product as recited in claim 13, wherein the other users have a same job title as the user.

15. A system for customizing training contents for a user, comprising:
a processor configured to:
establish a user profile and a personal learning corpus for the user;
generate a first baseline indicating that the user is interested in a first topic and a second baseline indicating that the user is not interested in the first topic, wherein the first baseline and the second baseline are established based on one or more of biometrical indicators, facial expressions, and body language when the user is consuming contents related to the first topic;
monitor the user's reactions when the user is consuming contents related to a second topic, wherein the reactions include the one or more of biometrical indicators, facial expressions, and body language;
compare the reactions with the first baseline and the second baseline to determine an interest level; and
recommend additional contents related to the second topic if the interest level is higher than a predefined threshold.

16. The system as recited in claim 15, wherein the processor is further configured to:
add the recommended contents into the personal learning corpus; and
update the user profile with one or more skills learnt from the recommended contents.

17. The system as recited in claim 15, wherein the user profile includes contents that the user has viewed and skills that the user has, wherein the contents that the user has viewed include live presentations, online presentations, online or physical books, online or physical training materials, and emails; and the skills that the user has are revealed in a resume and skill badges.

18. The system as recited in claim 15, wherein the processor is further configured to:
compare the personal learning corpus with other users' personal learning corpora; and
adding new contents of the other users' personal learning corpora into the personal learning corpus.

19. The system as recited in claim 18, wherein the other users have a same job title as the user.

20. The system as recited in claim 18, wherein the other users and the first user joined in a same live presentation.

\* \* \* \* \*